United States Patent
Umemoto et al.

(10) Patent No.: US 7,081,941 B2
(45) Date of Patent: Jul. 25, 2006

(54) LIQUID-CRYSTAL DISPLAY DEVICE AND COLORED RESIN SUBSTRATE

(75) Inventors: Seiji Umemoto, Osaka (JP); Kiichi Shimodaira, Osaka (JP)

(73) Assignee: Nitto Denko Corporation, Osaka (JP)

(*) Notice: Subject to any disclaimer, the term of this patent is extended or adjusted under 35 U.S.C. 154(b) by 745 days.

(21) Appl. No.: 09/782,201

(22) Filed: Feb. 14, 2001

(65) Prior Publication Data

US 2001/0030724 A1    Oct. 18, 2001

(30) Foreign Application Priority Data

Feb. 14, 2000    (JP)    ............... P. 2000-034957

(51) Int. Cl.
*G02F 1/1335*    (2006.01)
(52) U.S. Cl. ............... 349/158; 349/162; 349/176
(58) Field of Classification Search ............... 349/106, 349/115, 110, 158, 176, 162; 428/1.3, 1.31, 428/1.33, 1.6
See application file for complete search history.

(56) References Cited

U.S. PATENT DOCUMENTS

| | | | |
|---|---|---|---|
| 4,514,041 A | * | 4/1985 | Tanaka ............... 349/96 |
| 5,493,430 A | * | 2/1996 | Lu et al. ............... 349/106 |
| 5,645,901 A | * | 7/1997 | Fukuchi et al. ............... 428/1.4 |
| 5,648,197 A | * | 7/1997 | Kuroda ............... 430/270.11 |
| 6,335,774 B1 | * | 1/2002 | Ono ............... 349/106 |

FOREIGN PATENT DOCUMENTS

| | | | |
|---|---|---|---|
| EP | 0 895 141 | * | 2/1999 |
| JP | 63-249126 | * | 10/1988 |
| JP | 5-11234 | | 1/1993 |
| JP | 7-104262 | | 4/1995 |
| JP | 8-502837 | | 3/1996 |
| WO | 94-10260 | | 5/1994 |

OTHER PUBLICATIONS

Patent Abstract of Japan 05-011234, Jan. 19, 1993.

* cited by examiner

*Primary Examiner*—Toan Ton
*Assistant Examiner*—Tai Duong
(74) *Attorney, Agent, or Firm*—Sughrue Mion, PLLC

(57) ABSTRACT

There is provided a liquid-crystal display device has at least a liquid-crystal panel which is constituted by a back side substrate having a colored resin substrate with an electrode, a visual side transparent substrate having a transparent electrode, and a reflection type liquid-crystal layer interposed between the visual side substrate and the back side substrate. There is provided a colored resin substrate formed of at least a mixture of a transparent resin and a pigment.

7 Claims, 1 Drawing Sheet

PRIOR ART

LIQUID-CRYSTAL DISPLAY DEVICE AND COLORED RESIN SUBSTRATE

BACKGROUND OF THE INVENTION

1. Field of the Invention

The present invention relates to a liquid-crystal display device which uses a reflection type liquid-crystal layer to make the liquid-crystal display device small in thickness, size and weight and excellent in contrast, and further relates to a colored resin substrate adapted for a back side substrate of a liquid-crystal panel used in the liquid-crystal display device.

The present application is based on Japanese Patent Application No. 2000-34957, which is incorporated herein by reference.

2. Description of the Related Art

Conventionally, as a liquid-crystal panel using a reflection type liquid-crystal layer of a macromolecular dispersion type or of a cholesteric liquid-crystal type, that which is shown in FIG. 2 is known. That is, as shown in FIG. 2, a reflection type liquid-crystal layer 3 is interposed between a pair of transparent substrates 2 having transparent electrodes 22, and a light absorption layer 4 constituted by a support film 41, a black printed layer 42 provided on the support film 41, and an adhesive layer 43 provided on the layer 42, the light absorption layer 4 being bonded to a back side of the liquid-crystal panel through the adhesive layer 43. The light absorption layer 4 is provided for improving contrast of display light.

That is, in the macromolecular dispersion type or cholesteric liquid-crystal type liquid-crystal panel, reflected/inverted light of the light transmitted through the liquid-crystal layer was a cause of lowering of contrast because display light was generated by scatter reflection or characteristic reflection of the liquid-crystal layer. In order to prevent the lowering of contrast, the light absorption layer was provided so as to absorb the transmitted light. Addition of the light absorption layer, however, brought both increase in number of constituent parts and increase in volume and weight of the panel. Hence, reflected light was generated in an interface between the back side substrate and the light absorption layer so that contrast of display light was lowered. Hence, there was a problem that display quality was deteriorated.

SUMMARY OF THE INVENTION

A problem of the present invention is to develop a liquid-crystal display device which uses a reflection type liquid-crystal layer to make the liquid-crystal display device small in thickness, size and weight and excellent in contrast.

According to the present invention, there is provided a liquid-crystal display device comprising a liquid-crystal panel which includes: a back side substrate constituted by a colored resin substrate having an electrode; a visual side transparent substrate having a transparent electrode; and a reflection type liquid-crystal layer interposed between the visual side substrate and the back side substrate. There is further provided a colored resin substrate which is formed of at least a mixture of a transparent resin and a pigment.

According to the present invention, the back side substrate is colored so that the back side substrate absorbs the light transmitted through the liquid-crystal layer based on the coloring of the back side substrate. Hence, it is unnecessary to provide any light absorption layer separately. Hence, the number of constituent parts for the liquid-crystal panel can be reduced, so that production efficiency of the liquid-crystal panel can be improved. Moreover, the thickness, size and weight or the liquid-crystal panel can be reduced. In addition, generation of the reflected light by the back side of the back side substrate can be prevented. Thus, by use of a reflection type liquid-crystal layer, it is possible to obtain a liquid-crystal display device excellent both in contrast of display light and in display quality. A colored resin substrate according to the present invention is excellent in light absorption power so as to be able to obtain deep coloring. Hence, there can be also obtained a liquid-crystal display device which is easy to view and which is excellent in display quality.

Features and advantages of the invention will be evident from the following detailed description of the preferred embodiments described in conjunction with the attached drawings.

DETAILED DESCRIPTION OF THE PREFERRED EMBODIMENTS

Figure 1:
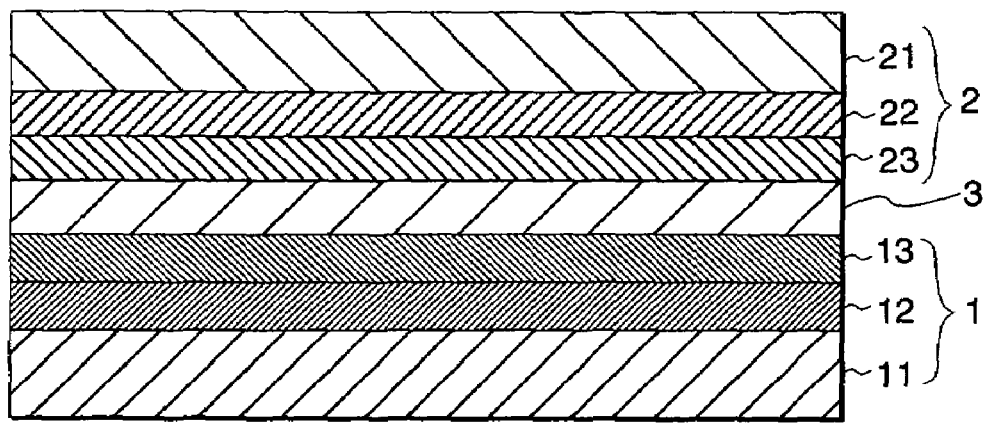
FIG. 1 is a sectional view showing an embodiment of the present invention.
Figure 2:
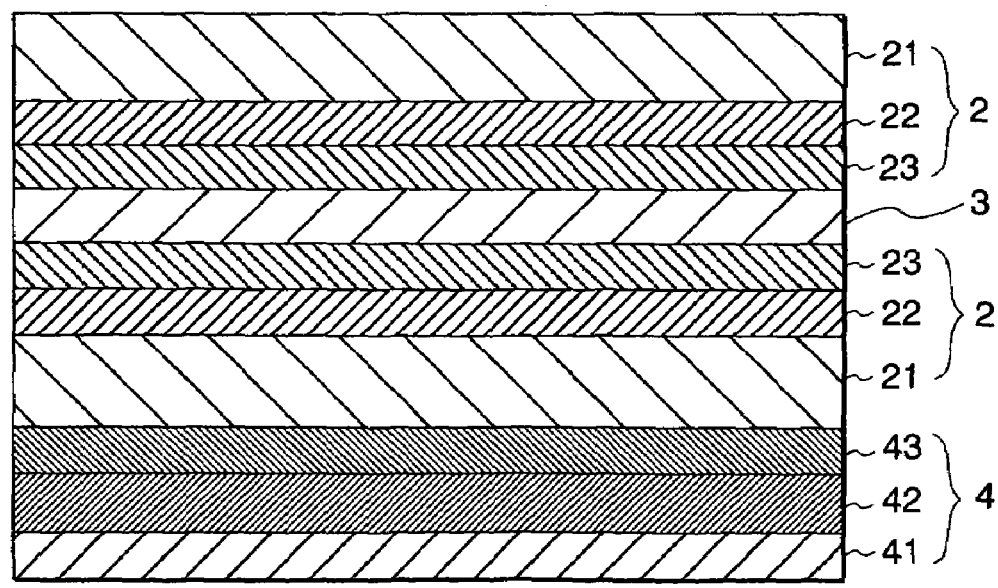
FIG. 2 is a sectional view showing an example of a background-art device.

The liquid-crystal display device according to the present invention comprises a liquid-crystal panel which includes: a back side substrate constituted by a colored resin substrate having an electrode; a visual side transparent substrate having a transparent electrode; and a reflection type liquid-crystal layer interposed between the visual side substrate and the back side substrate. FIG. 1 shows an example of the liquid-crystal display device. In the device, a back side substrate 1 includes a colored resin substrate 11, an electrode 12, and an aligned film 13. A visual side substrate 2 includes a transparent substrate 21, an electrode 22, and an aligned film 23. The reference numeral 3 designates a reflection type liquid-crystal layer.

One suitable kind of resin or two or more suitable kinds of resins such as thermoplastic resins, curable resins, etc., may be used as the transparent resin for forming the colored resin substrate. Incidentally, examples of the resin include polycarbonate, polyallylate, polyether-sulfone, polyester, polysulfone, triacetyl cellulose, polymethyl methacrylate, polyether-imide, polyamide, polyvinyl chloride, polystyrene, polyether-ether-ketone, epoxy resin, unsaturated polyester, polydiallyl phthalate, polyisobornyl methacrylate, and so on. Especially, a resin having a glass transition temperature of not lower than 90° C. may be preferably used from the point of view of durability, etc.

The colored resin substrate is made of a mixture of a transparent resin and one suitable kind of colorant or two or more suitable kinds of colorants such as pigments, dyes, etc. The colored resin substrate can be formed by means of molding the mixture into the form of a substrate. A suitable molding method such as an extrusion molding method, or a casting method which uses a dispersion in a solvent, or the like, may be used for molding the substrate. When the colored resin substrate is used as a back side substrate, a light absorbing function can be added based on coloring of the backside substrate. Hence, sufficient light absorption occurs when the light transmitted through the liquid-crystal layer propagates inside the substrate. Hence, the light reflected by the back side of the substrate can be reduced to an ignorable extent. Hence, contrast can be prevented from being lowered.

When the transparent resin and the colorant are combined with each other as described in the aforementioned case, light absorption through the colored resin substrate starts just after the formation of an image in the liquid-crystal layer. Hence, deep coloring can be obtained, so that easy viewing and good display quality can be achieved. Moreover, since the colored resin substrate is used, foreign matters, or the like, mixed into the substrate become inconspicuous. Hence, it is unnecessary to take measures to prevent such foreign matter from reflecting on display. In addition, the substrate can be made of a resin which is hardly affected by retardation and which is excellent in elasticity, strength and heat resistance. Hence, the durability of the liquid-crystal panel can be improved.

The color of the colored resin substrate can be determined suitably without any particular limitation. Although a black substrate is preferred from the point of view of contrast, a red or blue substrate, or the like, maybe used. The thickness of the substrate can be determined suitably in accordance with strength, or the like. Generally, the thickness of the substrate is selected to be in a range of from 20 μm to 1 mm, especially in a range of from 50 to 700 μm, more especially in a range of from 100 to 500 μm.

Although a glass substrate may be used as the visual side transparent substrate, a resin substrate may be preferably used as the visual side transparent substrate from the point of view of unbreakability, lightweight, etc. The resin substrate can be formed in the same manner as that in the aforementioned colored resin substrate except that the resin substrate is provided as a transparent substrate without any colorant contained. Especially, a substrate which is as small in retardation as possible is preferable from the point of view to prevent display quality from being deteriorated.

The liquid-crystal panel is provided into the configuration of substrates having electrodes 12 and 22 to control liquid crystal, as shown in FIG. 1. Therefore, in each of the substrates, such an electrode or an electrically conductive film for forming the electrode may be provided. In this case, it is necessary to provide a transparent electrode or a transparent electrically conductive film in the visual side transparent substrate, while an electrode or an electrically conductive film provided in the backside substrate of the colored resin substrate may be transparent or opaque. Generally, the electrode or electrically conductive film in the back side substrate is provided as a transparent one in order to prohibit viewing of the electrode. Incidentally, for the optional purpose of forming a touch panel, or the like, another electrode or another electrically conductive film as a separate body may be provided on the other surface of the colored resin substrate opposite to the one surface where the aforementioned electrode, or the like, is provided.

A suitable electrically conductive material similar to that used in the background art may be used to form the transparent or opaque electrode, or the like, without any particular limitation. A method similar to that used in the background art maybe used for forming the electrode, without any particular limitation. Incidentally, examples of the suitable material include electrically conductive materials made of metal oxides such as indium oxide, tin oxide, titanium oxide, cadmium oxide and mixtures of the metal oxides; metals such as gold, silver, platinum, palladium, copper, aluminum, nickel, chromium, titanium, iron, cobalt, tin and alloys of these metals; or other metal compounds such as copper iodide. Examples of the method include: a method of providing one of the electrical conductive materials on a substrate by a suitable thin-film-forming method such as a vacuum vapor deposition method, a sputtering method, an ion-plating method, a spray heat decomposition method, a chemical plating method, an electroplating method, a combination method of the above-mentioned methods, or the like; a method of applying a conductive coating material onto a substrate; and so on.

Incidentally, when the electrode is provided on the substrate, a suitable pre-treatment such as corona treatment, ultraviolet-ray treatment, plasma treatment, sputter etching treatment, undercoat treatment, or the like, may be applied to a surface of the substrate so that adhesion between the substrate and the electrode layer can be enhanced. A suitable material such as an acrylic resin, an urethane-acrylic resin, an epoxy resin, a hydrolyzed polymer/condensate of metal alcoxide, or the like, may be used for the undercoat treatment and may contain a filler such as silica particles, alumina particles, or the like in the suitable material.

The liquid-crystal panel can be formed as follows. As shown in FIG. 1, the back side substrate 1 which is constituted by a colored resin substrate, and the visual side substrate 2 which is constituted by a transparent substrate are formed so that the liquid-crystal-control electrodes 21 and 22 provided in the substrates 1 and 2 respectively face each other. The substrates 1 and 2 may be disposed through a gap adjuster as occasion demands. The reflection type liquid-crystal layer 3 is interposed between the substrates 1 and 2 When the liquid-crystal panel is formed, suitable aligned films 13 and 23 made of rubbing films for aligning liquid crystal may be provided on the electrodes 12 and 22 respectively as occasion demands, as shown in FIG. 1.

A suitable layer such as a macromolecular dispersion type layer having liquid crystal dispersed in a macromolecular matrix (as disclosed in JP-A-7-104262, JP-A-5-11234, etc.), a layer using cholesteric liquid crystal (chiral nematic liquid crystal) capable of exhibiting characteristic reflection based on a chiral structure (as disclosed in JP-A-8-502837, etc.), or the like, may be used as the reflection type liquid-crystal layer.

The liquid-crystal display device according to the present invention may be formed in the manner similar to that used in the background art without any particular limitation except that the aforementioned liquid-crystal panel is used. Hence, the liquid-crystal display device can be formed to have at least one suitable optical layer such as a polarizer, a retarder, a light diffusing layer, an anti-reflection layer, an anti-glare layer, etc. which are generally used for forming the liquid-crystal display device.

Lead electrodes for connecting external circuits may be provided in the manner similar to that used in the background art. Further, a hard coat layer made of a resin such as an acrylic resin, a silicone resin, an epoxy resin, etc., may be provided on a surface of the liquid-crystal display device as occasion demands. A surface of the hard coat layer maybe formed as an anti-glare surface with a structure of fine prismatic structures.

EXAMPLE 1

An alicyclic epoxy resin or a mixture of an alicyclic epoxy resin with a black pigment was injected into a mold in which two mirror-polished plates were disposed and fixed through a spacer having a predetermined thickness. The alicyclic epoxy resin or the mixture was cured at 120° C. for 2 hours. Thus a transparent resin plate or a back plate 200 μm thick was obtained. After the thus obtained transparent or black plate was cut into a substrate of a predetermined size, the substrate was subjected to plasma treatment in an argon atmosphere. Then, one transparent electrode made of indium-tin oxide (ITO) was formed on the transparent or black substrate by a sputtering method. The transparent electrode of the substrate was spin-coated with a polyvinyl alcohol solution to form a died film. The dried film of the polyvinyl alcohol solution was rubbed. Thus, a visual side transparent substrate and a backside black substrate were thus obtained, respectively.

The transparent electrode in the visual side substrate was split into two parts by etching. The visual side and back side substrates thus obtained were then disposed opposite to each other through the electrodes so that the rubbing directions cross perpendicularly to each other. The substrates were fixed to each other through a sealing material while a gap adjuster made of sphaerical glass beads was disposed between the substrates. Then, a mixture consisting of 10 parts by weight of trimethylpropane acrylate, 10 parts by weight of 2-hydroxyethyl acrylate, 25 parts by weight of acrylic oligomer (M-1200, made by TOAGOSEI Co., Ltd.), 0.5 parts by weight of photo-setting initiator (DARCUR by Chiba Specialty Chemicals) and 50 parts by weight of liquid crystal (E7, made by BDH Co.) was injected in between the substrates. The mixture was irradiated with ultraviolet rays from the transparent substrate side. Thus, a macromolecular dispersion type liquid-crystal layer was formed. An anti-reflection film was bonded to the visual side surface of the liquid-crystal panel through an adhesive layer so that the anti-reflection layer was positioned outside. Thus, a liquid-crystal display device was obtained.

EXAMPLE 2

A liquid-crystal display device was obtained in the manner similar to that used in Example 1 except that the black substrate was replaced by a red substrate containing a red pigment.

COMPARATIVE EXAMPLE 1

A liquid-crystal display device was obtained in the manner similar to that used in Example 1 except that the black substrate was replaced by a transparent resin substrate.

COMPARATIVE EXAMPLE 2

A 50 μm-thick polyester film printed with a black coating material was bonded to the back side of a liquid-crystal display device obtained in the manner similar to that used in Comparative Example 1, through a 25 μm-thick adhesive layer. Thus, a liquid-crystal display device having a light absorption layer was obtained.

Evaluation Test

The liquid-crystal display device obtained in each of Example 1 and Comparative Examples 1 and 2 was disposed on a sheet of black paper. While the liquid-crystal display device on the black paper was irradiated with illumination light at an angle of 20 degrees from a ring-like illuminator in a dark room, a voltage was applied to one of two split parts of the electrode while no voltage was applied to the other split part, so that white and black display portions in the liquid-crystal display device were formed. Both frontal luminance and contrast ratio were measured in the aforementioned condition. Incidentally, when a voltage was applied, light was scattered and reflected so that the liquid-crystal display device turned into a white display state. When no voltage was applied, light was transmitted without being scattered so that the liquid-crystal display device turned into a black display state.

Results of the aforementioned measurement were shown in the following Table.

|  | Frontal Luminance (cd/m$^2$) | | |
| --- | --- | --- | --- |
|  | White Display | Black Display | Contrast Ratio |
| Example 1 | 273 | 44 | 6.2 |
| Comparative Example 1 | 286 | 92 | 3.1 |
| Comparative Example 2 | 281 | 52 | 5.4 |

In the above description, very clear display was obtained in Example 1. In Comparative Example 1, display was viewed as if it were floating in the air. In Comparative Example 1, contrast ran short and the display was hard to be viewed. Moreover, in Comparative Example 1, contrast was lowered because of the light reflected on the black paper disposed on the back side. On the other hand, Comparative Example 2 was slightly inferior in contrast to Example 1. Particularly the drawback to Comparative Example 2 was that both increase in the number of steps and increase in thickness were caused by the provision of the light absorption layer. On the other hand, in Example 2, clear display with red background and white was obtained. It is proved from the above description that light absorption owing to the colored substrate can be achieved in the present invention so that it is possible to efficiently produce a liquid-crystal display device which uses a reflection type liquid-crystal layer to make the display device small in thickness, size and weight and excellent in display quality.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A backside substrate comprising:
   a colored resin substrate which is formed of at least a mixture of a transparent resin and a colorant, and
   a transparent electrically conductive film on at least one side of said colored resin substrate,
   wherein said backside substrate is attached to a visual side substrate having an electrode and a transparent resin, and
   said colored resin substrate has a color such that a foreign substance mixed into said colored resin substrate becomes inconspicuous.

2. A colored resin substrate according to claim 1, wherein said colored resin substrate is not thicker than 1 mm.

3. A colored resin substrate according to claim 1, wherein said colored resin substrate is black.

4. A colored resin substrate according to claim 1, wherein said colored resin substrate has a glass transition temperature of not lower than 90° C.

5. A liquid-crystal display device comprising a liquid-crystal panel, said liquid-crystal panel including:
   a back side substrate constituted by a colored resin substrate having an electrode;

a visual side transparent substrate having a transparent electrode; and a reflection type liquid-crystal layer interposed between said visual side substrate and said back side substrates, wherein said colored resin substrate has a color such that a foreign substance mixed into said colored resin substrate becomes inconspicuous.

6. A liquid-crystal display device according to claim 5, wherein said back side substrate disposed on the back side of said liquid-crystal panel is composed of a colored resin substrate formed of at least a mixture of a transparent resin and a colorant, further comprising a transparent electrically conductive film on at least one side of said colored resin substrate to form the backside substrate, and said reflection type liquid-crystal layer is of a macromolecular dispersion type or of a cholesteric liquid-crystal type.

7. A liquid-crystal display device as claimed in claim 5, wherein said back side substrate absorbs light.

* * * * *